United States Patent [19]
Oguro

[11] Patent Number: 5,349,384
[45] Date of Patent: Sep. 20, 1994

[54] APPARATUS AND METHODS FOR TRANSMITTING COMPRESSED DIGITAL IMAGE SIGNALS

[75] Inventor: Masaki Oguro, Tokyo, Japan

[73] Assignee: Sony Corporation, Tokyo, Japan

[21] Appl. No.: 998,606

[22] Filed: Dec. 30, 1992

[30] Foreign Application Priority Data

Jan. 14, 1992 [JP] Japan .................................. 4-024487
Jan. 14, 1992 [JP] Japan .................................. 4-024488

[51] Int. Cl.$^5$ .............................................. H04N 7/133
[52] U.S. Cl. .................................... 348/405; 358/335
[58] Field of Search ........................ 358/133, 335, 141; 348/27, 405, 419; H04N 7/133, 5/78

[56] References Cited

U.S. PATENT DOCUMENTS

| | | | |
|---|---|---|---|
| 4,723,176 | 2/1988 | Ive ....................................... | 360/19.1 |
| 4,816,914 | 3/1989 | Ericsson ............................... | 358/133 |
| 4,920,426 | 4/1990 | Hatori et al. ......................... | 358/133 |
| 5,012,352 | 4/1991 | Yoshimura et al. .................. | 358/343 |
| 5,073,821 | 12/1991 | Juri ..................................... | 358/133 |
| 5,144,426 | 9/1992 | Tanaka et al. ........................ | 358/133 |
| 5,150,208 | 9/1992 | Otaka et al. .......................... | 358/133 |
| 5,175,631 | 12/1992 | Juri et al. ............................. | 358/133 |
| 5,237,424 | 8/1993 | Nishino et al. ....................... | 358/133 |
| 5,251,029 | 10/1993 | Enari et al. ........................... | 358/133 |

FOREIGN PATENT DOCUMENTS

| | | |
|---|---|---|
| 0239076 | 9/1987 | European Pat. Off. . |
| 0267579 | 5/1988 | European Pat. Off. . |
| 0303450 | 2/1989 | European Pat. Off. . |
| 0364986 | 4/1990 | European Pat. Off. . |
| 0401854 | 12/1990 | European Pat. Off. . |
| 0493130 | 7/1992 | European Pat. Off. . |

OTHER PUBLICATIONS

IEEE Transactions on Consumer Electronics vol. 35 No. 3, Aug. 1, 1989, New York pp. 450–457.
Patent Abstracts of Japan vol. 15, No. 355 (E-1109) Sep. 9, 1991 and JP-A-03139079 (Matsushita Electric Ind. Co. Ltd.) Jun. 13, 1991.
IEEE Transactions on Consumer Electronics vol. 36, No. 3, Aug. 1, 1990, New York pp. 262–268.

*Primary Examiner*—Tommy P. Chin
*Assistant Examiner*—Richard Lee
*Attorney, Agent, or Firm*—William S. Frommer; Alvin Sinderbrand

[57] ABSTRACT

Apparatus and methods are provided for variable length encoding and transmitting a plurality of predetermined portions of digital image signals which has been encoded to compress image data therein. Each of the plurality of predetermined portions is variable length encoded to form a corresponding one of a plurality of variable length encoded portions. The amount of data in each of the portions is limited so that an amount of data contained in the corresponding variable length encoded portion is equal to or less than a predetermined target value. The variable length encoded portions are arranged in a plurality of sync blocks having a predetermined data length such that each portion is contained entirely within a respective number of sync blocks and the sync blocks are transmitted via a transmission medium.

18 Claims, 5 Drawing Sheets

APPARATUS AND METHODS FOR TRANSMITTING COMPRESSED DIGITAL IMAGE SIGNALS

BACKGROUND OF THE INVENTION

The present invention relates to methods and apparatus for transmitting compressed digital image signals, such as digital image signals subjected to discrete cosine transformation (DCT) for highly efficient coding.

Digital video tape recorders (VTRs) are available for recording digital video signals on magnetic tape with the use of rotating heads. Digital video signals contain large amounts of data, so that it is desirable to employ a highly efficient coding technique for compressing such data for transmission, for example, for recording on magnetic tape. Discrete cosine transformation has been employed for this purpose.

Discrete cosine transformation carries out a transformation of image data into the frequency domain. An image provided as a frame of digital data is subdivided into blocks of data, for example, eight-by-eight pixel blocks, and each of the blocks is transformed into the frequency domain to effect an orthogonal transformation thereof. The DCT process yields blocks of frequency coefficient data in eight-by-eight format. Thereafter, the blocks of coefficient data are variable length encoded utilizing for example, run length encoding, Huffman encoding, or the like, prior to transmission. Typically, a block synchronization signal is added to the variable length encoded data at intervals of predetermined data amounts for transmission.

Digital video recording apparatus, such as digital VTRs and apparatus for recording on disc-shaped recording media, normally record each field or frame of video data entirely in a respective track or in a respective group of tracks. However, when the video data is variable length encoded, the amount of data varies from frame to frame due to variations in the informational content of the various frames. In order to record the data of each field or frame entirely in a respective track or group of tracks, it is necessary to ensure that the amount of data within each field or frame is limited so that it does not exceed a predetermined target value. For this purpose, a buffering process is carried out to control the amount of data generated for each field or frame interval. However, since the amount of data in a given field or frame is very large, both a large memory capacity and complex processing circuitry are required for this purpose.

Consequently, it is desirable to employ a buffering process which controls data amounts in predetermined data intervals which are considerably shorter than one frame. Such data intervals are referred to as "buffering units" and, as ultimately included in sync block format, as "video groups".

Each buffering unit or video group has a predetermined quantization interval for the data included therein. Often, data from different video groups are contained in the same sync block, so that respective quantization numbers representing the quantization intervals of each of the video groups should also be included in each sync block. To decrease redundancy in the data, however, only one quantization number is transmitted for each video group. Consequently, when the quantization number for a respective video group suffers an error in transmission, none of the data in the corresponding video group can be recovered.

A further problem occurs when the data is reproduced in a variable speed reproduction mode, that is, wherein the tape speed differs from that at which the data was recorded. In the variable speed reproduction mode, the scanning path of the reproducing heads does not correspond with the tracks on the tape, so that the data is not reproduced continuously. Consequently, in this mode the validity of each reproduced sync block must be determined. When the data of a video group exceeds the capacity of a sync block, the quantization number for that video group may be included in one sync block while a portion of the corresponding data may be included in one or more other sync blocks. Accordingly, an otherwise valid sync block may be reproduced in the variable speed reproduction mode, while its quantization number may be included in another sync block which was not reproduced. In that event, none of the data within the corresponding video group can be recovered. This leads generally to a overall decrease in the amount of data that can be reproduced in the variable speed reproduction mode.

Figure 1:
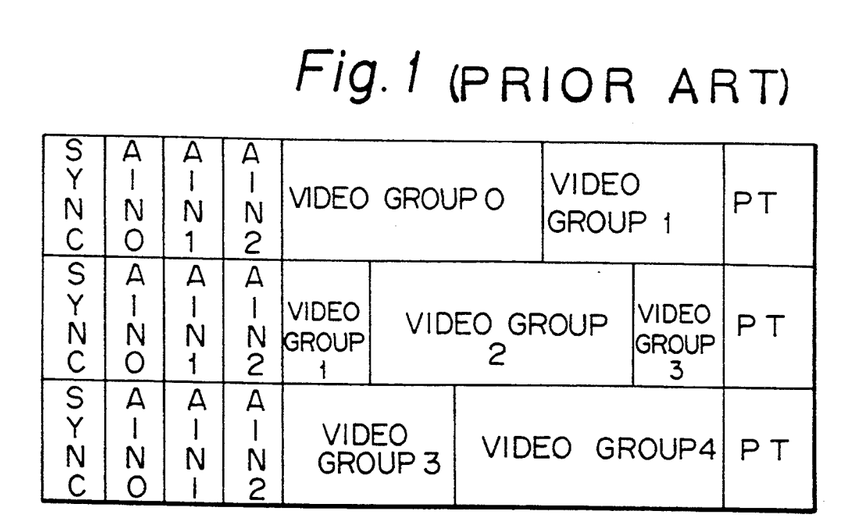
FIG. 1 is a schematic diagram illustrating a sync block format in accordance with the prior art.

If, however, the amount of data in each video group is smaller than the capacity of each sync block, the conventional sync block format may be illustrated as in FIG. 1, in which it is seen that the number of video groups in the various sync blocks varies. As illustrated in FIG. 1, each sync block includes first a block synchronization signal SYNC, then additional information AIN0, AIN1 and AIN2 each including a quantization number which identifies the quantization interval used in the buffering process for a respective video group which is contained in that sync block. Following the additional information, variable length encoded DCT coefficient data of either two or three video groups are included. Finally, parity data PT, generated as a result of error correction encoding, are included. As seen in FIG. 1, data from up to three video groups may be included in a single sync block. Consequently, each sync block includes at least three items of additional information data, that is, AIN0, AIN1 and AIN2 as shown in FIG. 1. The result is that a considerable amount of redundant information is included.

Figure 2:
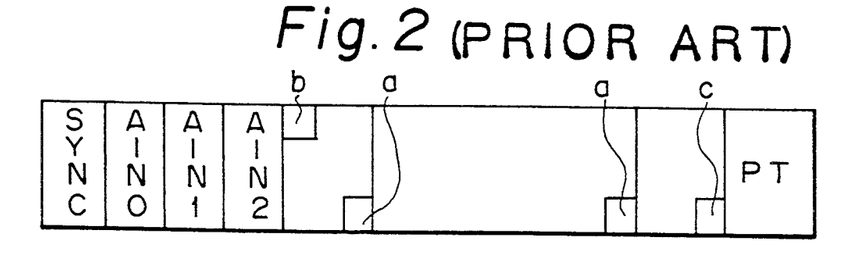
FIG. 2 is a schematic diagram illustrating empty areas included in a prior art sync block.

A further disadvantage of the conventional sync block format is illustrated in FIG. 2 wherein a single sync block includes data from three separate video groups. It will be seen that due to the arrangement of the data in this fashion, a number of "empty" areas, designated "a", "b" and "c" in FIG. 2, result That is, because the data is variable length encoded, each group is likely to include less than a whole number of bytes, resulting in the empty area "a" at the end of the video groups as shown in FIG. 2. Moreover, the area "b" is provided at the beginning of the first, partial video group as a delimiter of the variable length encoded symbols continued from the previous sync block, while the area "c" is a delimiter of the variable length encoded symbols of the third video group which is continued into the following sync block.

As noted above, in the variable speed reproduction mode, data is not reproduced continuously so that the validity of each sync block must be determined. It is important, therefore, that quantization numbers for each video group present in each sync block be included therein. Consequently, as shown in FIGS. 1 and 2, both unnecessary data and meaningless data are contained in each sync block, so that the capacity to convey information is lessened and the amount of data which ultimately can be reproduced is decreased. It would be desirable, therefore, to include only a single quantization number in each sync block, as well as to decrease the number of video groups contained in each sync block.

OBJECTS AND SUMMARY OF THE INVENTION

Accordingly, it is an object of the present invention to provide apparatus and methods for transmitting compressed digital image signals which overcome the foregoing disadvantageous and problems associated with the prior art.

It is another object of the present invention to provide apparatus and methods for transmitting compressed digital image signals which provide greater protection for quantization interval data included therein.

It is a further object of the present invention to provide methods and apparatus for recording compressed digital image signals which increase the amount of data which may be reproduced in a variable speed reproduction mode.

It is still another object of the present invention to provide apparatus and methods for recording compressed digital image data which reduce redundancy of reproduced data so that the system capacity is increased.

In accordance with a first aspect of the present invention, apparatus and methods are provided for variable length encoding and transmitting a plurality of predetermined portions of digital image signals which have been encoded to compress image data therein, comprising the means for and the steps of, respectively: encoding each of the plurality of predetermined portions to form a corresponding one of a plurality of variable length encoded portions; limiting an amount of image data contained in each of said plurality of predetermined portions such that an amount of data contained in data contained in the corresponding one of said plurality of variable length encoded portions is equal to or less than a predetermined target value; arranging said plurality of variable length encoded portions in a plurality of sync blocks having a predetermined data length such that each of said plurality of variable length encoded portions is contained entirely within a respective plurality of sync blocks; and transmitting each said respective plurality of sync blocks via a transmission medium.

Since the data of only one video group is included in each sync block, multiple quantization numbers need not be included therein. Consequently, data redundancy can be reduced. In addition, when multiple video groups are not included in each sync block, the number of "empty" areas in each sync block are decreased, thereby increasing system capacity.

In accordance with another aspect of the present invention, an apparatus for variable length encoding and transmitting a plurality of predetermined portions of digital image signals which have been encoded to compress image data therein comprises: first variable length encoding means for encoding each of the plurality of predetermined portions to form a corresponding one of a plurality of variable length encoded portions; requantization means for requantizing each of said plurality of predetermined portions with the use of a respective quantization interval to limit an amount of image data contained therein such that an amount of data contained in each of said plurality of variable length encoded portions is equal to or less than a predetermined target value; sync block transforming means for arranging said plurality of variable length encoded portions in a plurality of sync blocks having a predetermined data length such that each of said plurality of variable length encoded portions is contained entirely within a respective plurality of sync blocks; data addition means for adding respective quantization interval data to each of said plurality of sync blocks representing the respective quantization interval of the data included therein; and transmission means for transmitting each said respective plurality of sync blocks including said respective quantization interval data via a transmission medium.

In accordance with a further aspect of the present invention, an apparatus for recording variable encoded digital image signals in a plurality of tracks on a recording medium comprises: means for receiving a plurality of predetermined portions of digital image signals which have been encoded to compress image data therein; first quantizing means for requantizing each of said plurality of predetermined portions with the use of a respective quantization interval to produce a plurality of requantized portions; first variable length encoding means for encoding each of said plurality of requantized portions to form a plurality of variable length encoded portions; estimating means for estimating an amount of data contained in said each of said plurality of requantized portions upon variable length encoding thereof; selecting means for selecting said respective quantization interval based on the estimated amount of data such that an amount of data included in each of said plurality of variable length encoded portions is equal to or less than a predetermined target value; sync block transforming means for arranging said plurality of variable length encoded portions in a plurality of sync blocks having a predetermined data length such that each of said plurality of variable length encoded portions is contained entirely within a respective plurality of sync blocks; data addition means for adding respective quantization interval data to each of said plurality of sync blocks representing the respective quantization interval of the data included therein; and recording means for recording said plurality of sync blocks including said respective quantization interval data in said plurality of tracks such that plural ones of the variable length encoded portions arranged in said plurality of sync blocks are recorded in each of the tracks.

Since each sync block includes respective quantization interval data of a variable length encoded portion which is contained within a plurality of such sync blocks, each of the quantization interval data is transmitted multiple times so that greater protection is provided against errors occurring in the quantization interval data. In addition, since each sync block always contains quantization interval data for the variable length encoded data therein, quantization interval data for all of the variable length encoded data in each valid sync block is provided.

In accordance with still another aspect of the present invention, an apparatus and method for variable length encoding and transmitting a plurality of predetermined portions of digital image signals which have been encoded to compress image data therein, comprise the means for and the steps of, respectively: encoding each of the plurality of predetermined portions to form a corresponding one of a plurality of variable length encoded portions; requantizing each of said plurality of predetermined portions with the use of a respective quantization interval to limit an amount of image data contained therein such that an amount of data contained in each of said plurality of variable length encoded portions is equal to or less than a predetermined target value; arranging said plurality of variable length encoded portions in a plurality of sync blocks having a predetermined data length such that each of said plurality of sync blocks contains plural ones of said variable length encoded portions; adding data to each of said plurality of sync blocks including respective quantization interval data for each of said plural ones of said variable length encoded portions therein and a flag indicating whether said respective quantization interval data are the same or whether said respective quantization interval data represent the same quantization interval; and transmitting each said respective plurality of sync blocks including said respective quantization interval data and said flag via a transmission medium. By including such a flag, further protection against an error in the quantization number data is provided.

The foregoing, as well as other objects, features and advantageous of the present invention will become readily apparent from the following detailed description thereof which is to be read in connection with the accompanying drawings wherein like features are indicated by the same reference numerals and legends.

DETAILED DESCRIPTION OF CERTAIN ADVANTAGEOUS EMBODIMENTS

Figure 3:
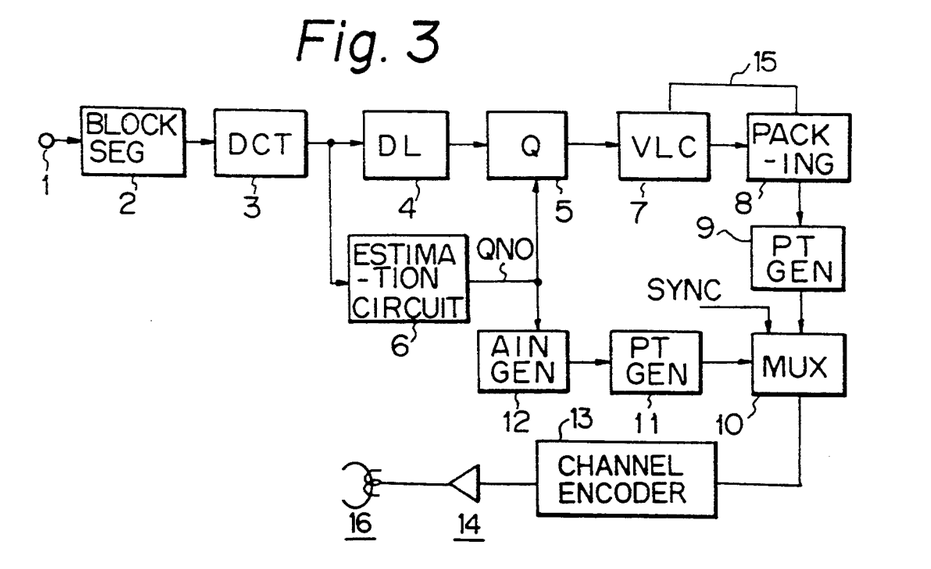
FIG. 3 is a block diagram of a digital video signal recording system of a digital VTR in accordance with an embodiment of the present invention.

FIG. 3 illustrates a video data recording circuit of a digital VTR in block diagram format in accordance with an embodiment of the present invention. Reference numeral 1 designates an input terminal at which digitized video data in raster scanning sequence is received and from which the received video data is supplied to a block segmentation circuit 2. The block segmentation circuit 2 transforms the received video data into the form of eight-by-eight pixel, two-dimensional blocks.

The block-formatted data thus produced by the block segmentation circuit 2 is supplied to a discrete cosine transformation (DCT) circuit 3 which serves to transform the received data into frequency coefficient data. That is, each block of received data is transformed to produce an eight-by-eight frequency coefficient block including one DC component and sixty-three AC components. The transformed data is supplied by the DCT circuit 3 to a quantizing circuit 5 through a delay circuit 4. As an example, the coefficient data, including sixty-four components per block, is transmitted in a zigzag scanning sequence proceeding from the DC component to the lowest order AC components, and continuing thereafter in the order of increasing frequency until the highest order components have been transmitted. The coefficient data is also supplied to an estimation circuit 6 in order to select an optimal quantization interval for use by the quantizing circuit 5 for reducing the amount of video data in accordance with the buffering process described hereinbelow. The delay circuit 4 serves to delay the video data as necessary to permit the estimation circuit 6 to determine the optimal quantizing step for use by the circuit 5.

Digital VTRs carry out an editing process on a frame-by-frame basis with the object that the amount of data included in each frame is prevented from exceeding a predetermined target value. The amount of data generated through the DCT and variable length encoding processes varies depending on the characteristics of the pictorial information which is encoded. The circuit of FIG. 3 carries out a buffering process for decreasing the amount of data within predetermined buffering units which are smaller than a frame so that the amount of data therein does not exceed a predetermined target value. This permits the use of a smaller memory capacity for the buffering process than is required to edit a complete frame of data and allows the use of simpler buffering circuitry. In this example, each buffering unit is composed of fifteen macro blocks each including a plurality of DCT blocks, as explained in greater detail hereinbelow.

The quantizing circuit 5 only quantized the AC components of the coefficient data, so that the DC component is transmitted without requantization. That is, the quantizing circuit 5 divides each AC component by the quantization interval selected by the estimating circuit 6 and quantizes the resultant quotient. The quantization interval is designated by a quantization number QNO supplied by the estimation circuit 6.

The requantized data produced by the quantizing circuit 5 is supplied thereby to a variable length encoding circuit 7 which carries out a run-length encoding process, Huffman encoding process, or the like.

The variable length encoded data produced by the circuit 7 has a maximum length of sixteen bits, so that each item of data as produced by the circuit 7 is sixteen bits in length. Accordingly, in each instance where the encoded data item is less than sixteen bits in length, dummy data is included by the circuit 7 to increase the length thereof to sixteen bits.

The circuit 7 supplies the variable length encoded data to a packing circuit 8 which serves to divide the received data into a series of bytes for subsequent assembly in this form with additional data, as described below, to form a sequence of sync blocks. In order to permit the packing circuit 8 to remove the dummy data included in the various items of code received from the circuit 7, the circuit 7 supplies length information to the packing circuit 8 for each code item via a control line 15. As rearranged in byte format, the data is output by the packing circuit 8 to a parity generating circuit 9 which carries out an error correction encoding process, thereby forming parities to be included with the data received from the circuit 8. The output of the parity generating circuit 9 is then supplied thereby to a multiplexer 10.

The quantization number QNO produced by the estimation circuit 6 is also supplied thereby to an additional information (AIN) generating circuit 12 which incorporates the received data QNO in additional information AIN which it supplies to a parity generating circuit 11 for error correction encoding. The circuit 11 then supplies the additional data AIN with its associated parities to the multiplexer 10. The multiplexer 10 is also supplied with a block synchronization signal SYNC. The multiplexer 10 serves to multiplex the outputs of the parity generating circuits 9 and 11 and the block synchronization signals SYNC on a time divisional basis and supplies the data thus assembled to a channel encoder 13. The channel encoder 13 encodes the received data in a form suitable for recording on magnetic tape and outputs the thus-encoded data to a plurality of recording amplifiers, indicated in FIG. 3 schematically by the amplifier 14, each of which drives a respective one of a plurality of magnetic heads, indicated schematically by the magnetic head 16, mounted on a rotational drum for recording the data on magnetic tape.

Figure 4:
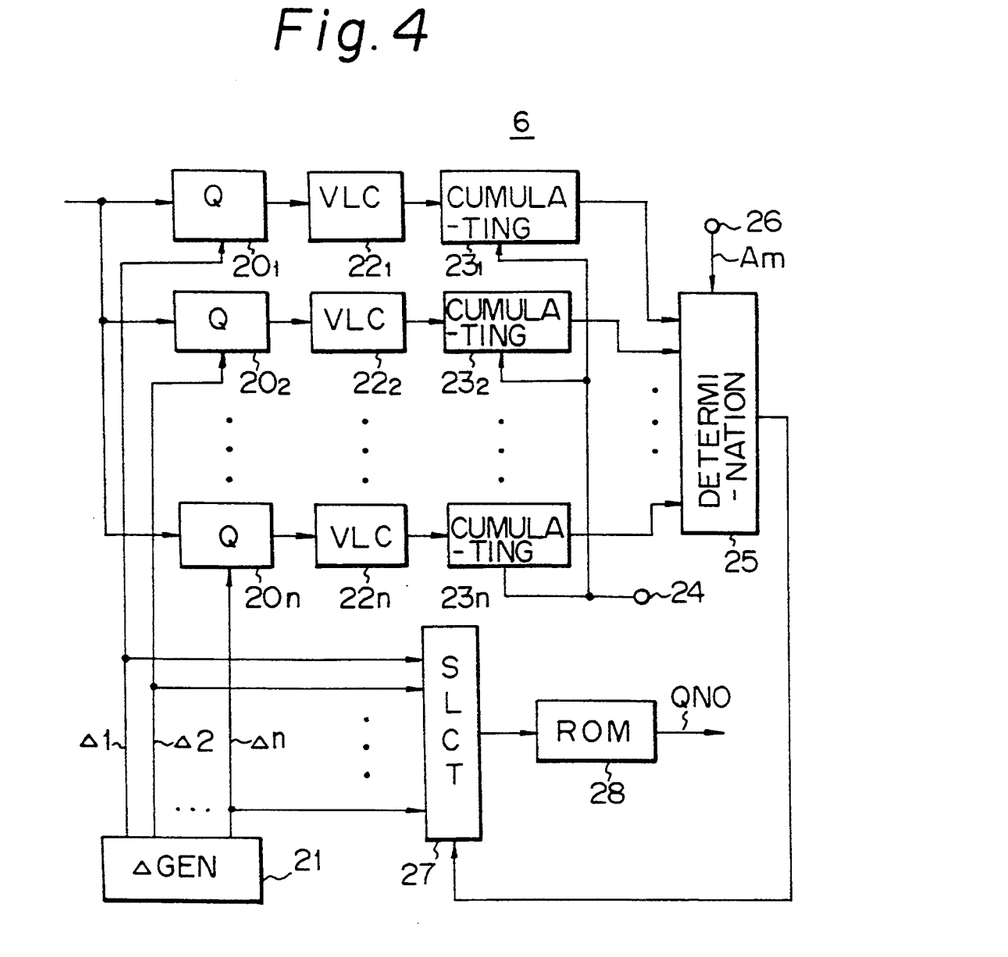
FIG. 4 is a block diagram illustrating an estimation circuit of the FIG. 3 embodiment.

The estimation circuit 6 serves to produce the quantization number QNO for use by the circuit 5 in requantizing the image data in order to decrease the amount of data included in each buffering unit, as required, so that the amount thereof does not exceed a predetermined target value, while selecting the smallest possible quantization interval. With reference also to FIG. 4, an embodiment of the estimation circuit 6 is illustrated therein in block format. The DCT circuit 3 supplies the AC coefficient data produced through discrete cosine transformation to each of n quantization circuits $20_1$, $20_2$, . . . and $20_n$. The DC coefficient data produced by the circuit 3 is not subjected to the buffering process, but rather is supplied directly by the circuit 3 to the packing circuit 8 for assembly in sync block format. The quantization circuits $20_1$ through $20_n$ receive respective predetermined quantization interval data $\Delta 1$, $\Delta 2$, . . . and $\Delta n$ from a quantization interval generating circuit 21.

The circuits $20_1$ through $20_n$ divide the received data by the respective quantization intervals and then, as quantized, the divided data are supplied to respective variable length encoding circuits $22_1$ through $22_n$. The circuits $22_1$ through $22_n$ encode the received data to form variable length codes in the same manner as the variable length encoding circuit 7. The resultant data are supplied by the circuits $22_1$ through $22_n$ to respective cumulating circuits $23_1$ through $23_n$. The cumulating circuits $23_1$ through $23_n$ calculate the amount of variable length encoded data generated for the respective buffering unit as requantized by a respective quantization interval. In the embodiment of FIG. 3, the buffering unit includes fifteen macro blocks of data, as described in greater detail hereinbelow. The respective data amounts as determined by the cumulating circuits $23_1$ through $23_n$ are supplied thereby to a determination circuit 25 and the cumulating circuits $23_1$ through $23_n$ then receive a reset pulse via a terminal 24.

The determination circuit 25 receives a predetermined data amount target value Am from a terminal 26 representing a maximum permissible amount of variable length encoded data to be included in each video group. The outputs of the cumulating circuits $23_1$ through $23_n$ in the target value Am are compared and the output from a respective one of the cumulating circuits which is closest to the target value, but not in excess thereof, is determined. The resultant determination is supplied to a selector 27 which is also supplied with the quantization intervals $\Delta 1$ through $\Delta n$. Based on the determination received from the determination circuit 25, the selector 27 selects the appropriate quantization interval for generating the desired amount of variable length encoded data for the respective buffering unit. The selected quantization interval is supplied to a ROM 28 which responds by outputting the quantization number QNO corresponding to the selected quantization interval. The quantization number QNO is supplied by the ROM 28 to the quantizing circuit 5 of FIG. 3 which includes a ROM (not shown for purposes of simplicity and clarity) for converting the received quantization number into the corresponding quantization interval.

It will be appreciated that quantization intervals other than those illustrated in FIG. 4 may be employed in the estimation circuit 6. Moreover, different quantization intervals may be used for requantizing different AC components, so that a common quantization interval need not be used for all components. In other words, the AC coefficient data may be divided into a plurality of groups depending on the order thereof and a plurality of quantization intervals each for a respective one of the groups can be provided. When such different quantization intervals are used, a plurality of sets of predetermined quantization intervals, each for a respective one of the groups, are provided so that each group may be quantized by each of the quantization intervals of its corresponding set, and by examining the result, the most suitable quantization interval may be selected.

Figure 5:
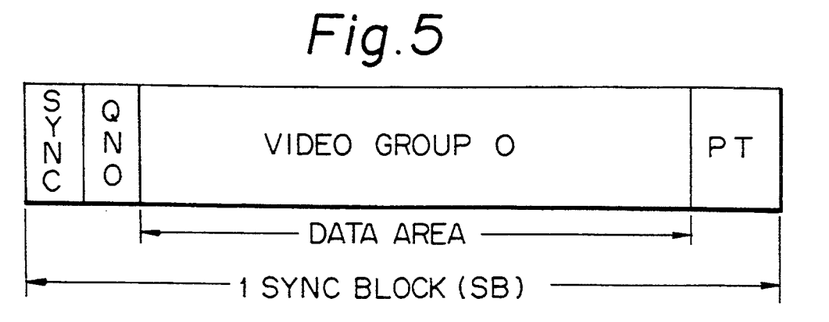
FIG. 5 is a schematic diagram for illustrating the format of a video data sync block produced by the embodiment of FIG. 3.

FIG. 5 illustrates the format of a sync block (SB) formed by the multiplexer 10. The sync block is composed of a sequence of bytes and includes a block synchronization signal SYNC, followed by additional information data AIN containing a quantization number QNO for identifying a respective quantization interval used in the buffering process for the data included in the sync block, then variable length encoded DCT data in which the amount of such data has been controlled by the above described buffering process, followed by parity data PT produced through error correction encoding of the variable length encoded DCT data. The additional information data also contains error correction parity data for the additional information therein. The additional information may also include, as needed, a macro block address, a sync number, a data ID, and so forth. Upon reproduction, after the variable length encoded data within the sync block has been decoded, the resultant data is multiplied by the quantization interval corresponding to the quantization number QNO contained in the additional information within the sync block to recover the AC coefficient data.

The error correction encoding process employs a Reed Solomon product code, so that the data is encoded both in the horizontal and vertical directions. The horizontal error correction code is referred to as an inner code, while the vertical error correction code is referred to as an outer code. The inner code is generated using the data contained in a respective sync block, so that a horizontal parity PT is thereby generated, although a sync block might contain only a vertical parity. In the variable speed reproduction mode wherein less than all of the sync blocks are reproduced, errors are corrected utilizing the inner code for each corresponding reproduced sync block.

Figure 6:
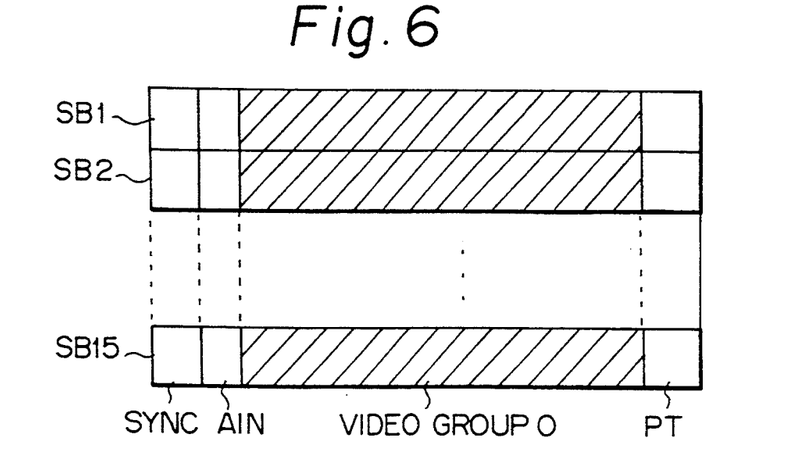
FIG. 6 is a schematic diagram for illustrating a respective plurality of video data sync blocks containing a single video data group in its entirety therein.

In the embodiment of FIG. 3, the buffering process is carried out to produce an amount of variable length data from the data of each buffering unit which may be contained within a predetermined whole number of sync blocks and the data length of the individual sync blocks is selected with this object in mind. More specifically, and with reference to FIG. 6, the buffering process is preformed in the embodiment of FIG. 3 such that variable length encoded DCT data of fifteen macro blocks constituting a video group 0 fits within the hatched data areas of fifteen sync blocks SB1 through SB15. That is, the data of each buffering unit constituting fifteen macro blocks is placed within the data areas of the fifteen sync blocks SB1 through SB15. The number of sync blocks chosen to contain the data of each buffering unit may be selected as a different number, for example, five sync blocks, instead of fifteen. In the example of FIG. 6, it will seen that the data length of each macro block will be nearly the same as that of one sync block.

In the embodiment of FIG. 3, each macro block includes a plurality of eight-by-eight DCT coefficient data including four luminance (Y) blocks and one each of color component (U) and (V) blocks. Where the sampling frequency is 4fsc, where fsc is the color subcarrier frequency, the image of one frame is composed of 910 samples by 525 lines, wherein the image data itself comprises 720 samples by 480 lines. In the above-described component system, each frame includes a number of blocks equal to:

(720×480 pixels/frame)×(6/4 data items/pixel)÷(8×8 data items/block)=8100 blocks/frame. Thus, 1350 (that is, 8100÷6=1350) macro blocks are included in each frame.

Figure 7:
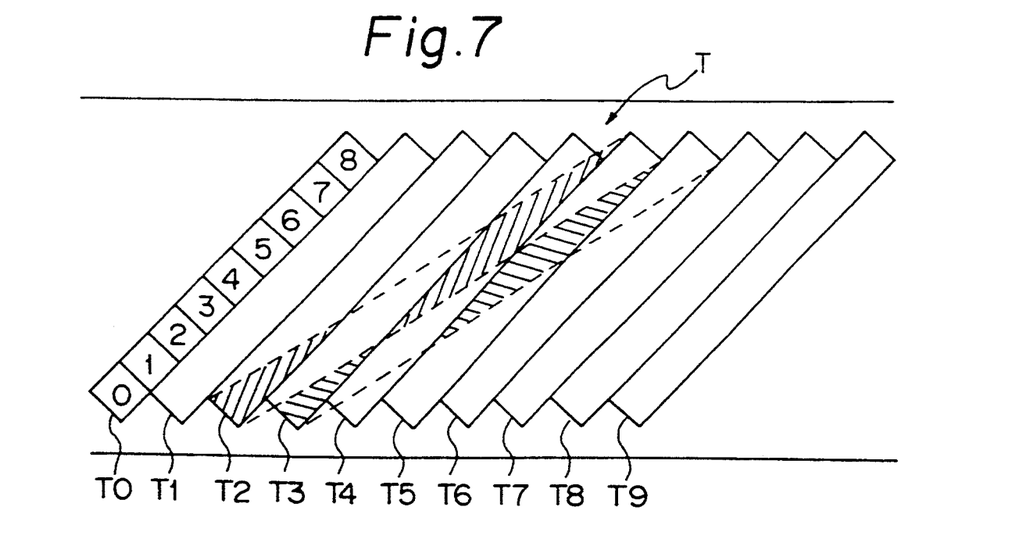
FIG. 7 is a schematic diagram for illustrating a track scanning pattern on a magnetic tape in a variable speed reproduction mode.

Referring now to FIG. 7, a magnetic tape T is illustrated therein on which a plurality of slant recording tracks T0 through T9 have been formed by the heads 16 mounted on a rotational drum (not shown for purposes of simplicity and clarity). More particularly, a pair of the heads 16 are disposed adjacently on the rotational drum so that they form a pair of adjacent tracks on the tape T simultaneously. The adjacently disposed heads have respectively different azimuth angles to reduce cross talk from adjacent tracks when the recorded data is reproduced. The data of each frame is divided into ten portions and recorded in the ten sequentially arranged tracks T0 through T9 as illustrated in FIG. 7. A PCM audio signal which has been error correction encoded is recorded along with the video data in the tracks T0 through T9. In the alternative, the PCM audio signal is recorded in an audio data recording area provided in one of the tracks.

Since the embodiment of FIG. 3 divides each frame into thirteen hundred and fifty macro blocks, and the frame is recorded in ten tracks on the tape T, one hundred thirty-five macro blocks are recorded in each track. Since each buffering unit includes fifteen macro blocks in the disclosed embodiment, as shown in track T0, nine video groups designated 0 through 8 are recorded in each track. As described above, the amount of data included in each video group is limited so that it does not exceed the target value Am such that the data of one hundred and thirty-five macro blocks can be recorded in a single track having a predetermined length.

In the variable speed reproduction mode, when the tape speed is, for example, four times that during the recording mode, each of an adjacent pair of reproducing heads scans across four different tracks each time it scans across the tape. Since the heads have different azimuth angles such that each reproduces data from tracks having corresponding azimuth angles, each head only reproduces data every other track. For example, with reference to FIG. 7, one of the pair of heads will reproduce data only from tracks T2 and T4, while the other will reproduce data only from tracks T3 and T5. It will be appreciated that not all of the data will be reproduced in the variable speed reproduction mode and a gap in the reproduced data may exist between sequentially reproduced, valid sync blocks. Accordingly, the quantization numbers contained in the sequentially reproduced, valid sync blocks may not be the same. However, since each sync block includes a quantization number for the data it contains, its data will not be lost due to the failure to reproduce a different sync block including the respective quantization number.

Figure 8:
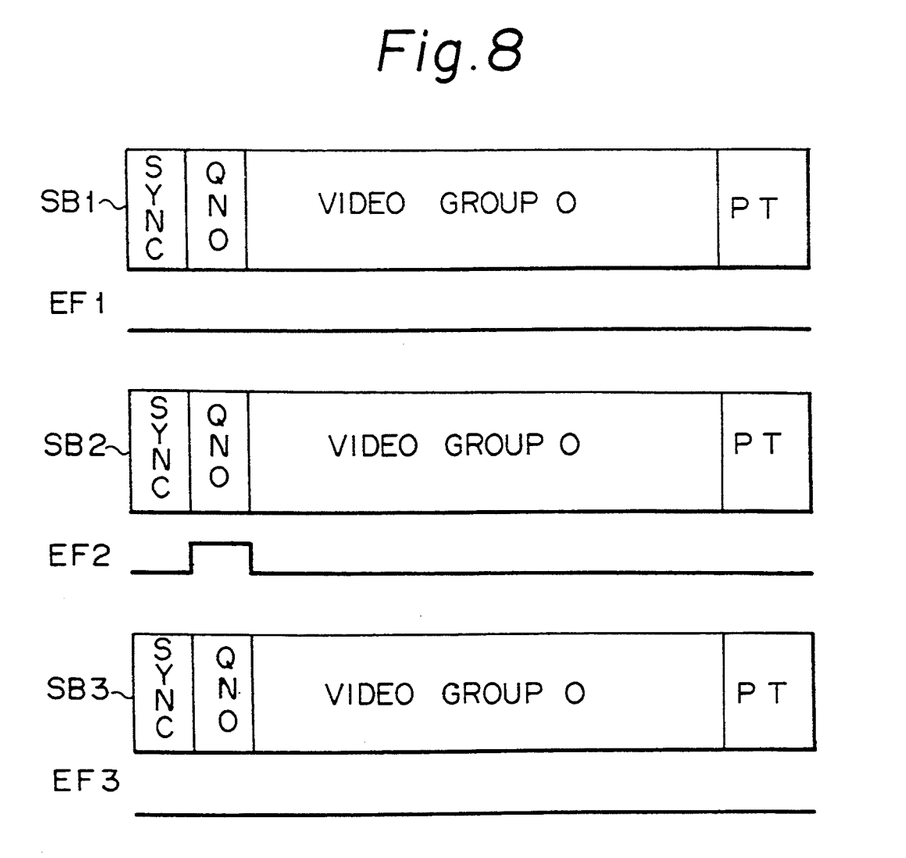
FIG. 8 is a schematic diagram for use in describing a technique for retrieving a valid quantization number despite the occurrence of an error.

Since each sync block includes its respective quantization number QN0 and the data of each video group is contained in multiple sync blocks each including the same quantization number, it is possible to provide additional protection against an error in the quantization number, for example, due to an error in a given sync block. As an example, with reference to FIG. 8, three sync blocks SB1, SB2 and SB3 including data of the same video group "0" are reproduced sequentially. An error correction circuit determines whether an error has taken place in the additional information AIN of each sync block, including the quantization number QN0 and generates appropriate error flags EF1, EF2 and EF3 for the data AIN in the sync blocks SB1, SB2 and SB3, respectively. In the example of FIG. 8, it will be seen that the quantization number QN0 of sync block SB2 contains an error. However, through the application of a majority rule, a correct quantization number can be recovered through the use of the corresponding data of the sync blocks SB1, SB2 and SB3.

Since the buffering process is carried out so that the information of each buffering unit is included in the data areas of a plurality of whole sync blocks, each sync block only requires information identifying the quantization interval of one video group. Consequently, data redundance is minimized. Moreover, in the reproduction mode, it is unnecessary to match the additional information including the quantization interval information with its relevant video group, so that the reproduction process may be simplified.

Figure 9:
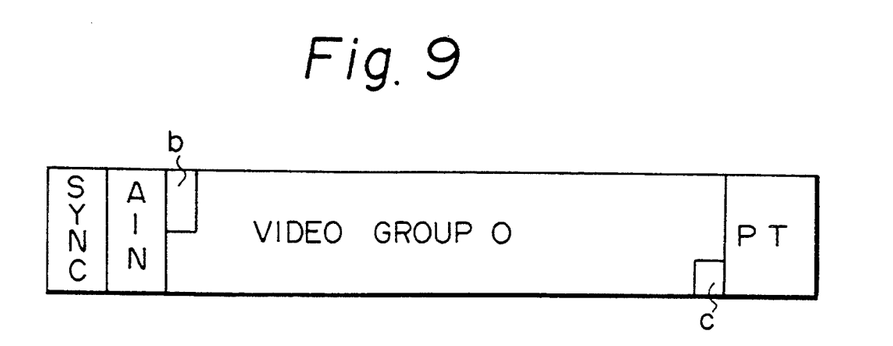
FIG. 9 is a schematic diagram for illustrating unnecessary data areas within a sync block.

A further advantage of the present invention will be explained in connection with FIG. 9 which illustrates a sync block such as one of the sync blocks SB1 through SB15 of FIG. 6. It will seen with reference to FIG. 9 that the data of a given video group within the sync block is preceded by a bit "b" which serves as part of a delimiter of the variable length code continued from a preceding sync block and a bit "c" which is a part of a delimiter of the variable length code continued into a following sync block. Since only one video group is included within the sync block of FIG. 9, there is no need to provide multiple delimiters such as multiple bits "b" and "c". Moreover, since the data of each video group is contained in multiple sync blocks, even though the buffering process may not precisely match the amount of data in the video group with the capacity of the sync blocks in which it is arranged, the resulting blank area need occur in only one of the sync blocks. Consequently, the amount of data which can be reproduced in the variable speed reproduction mode is advantageously increased. The present invention also assists in alleviating error propagation which can occur in variable length encoded data. That is, since each video group is contained within a plurality of whole sync blocks, the error is prevented from propagating and refreshing of the data can be carried out.

Figure 10A:
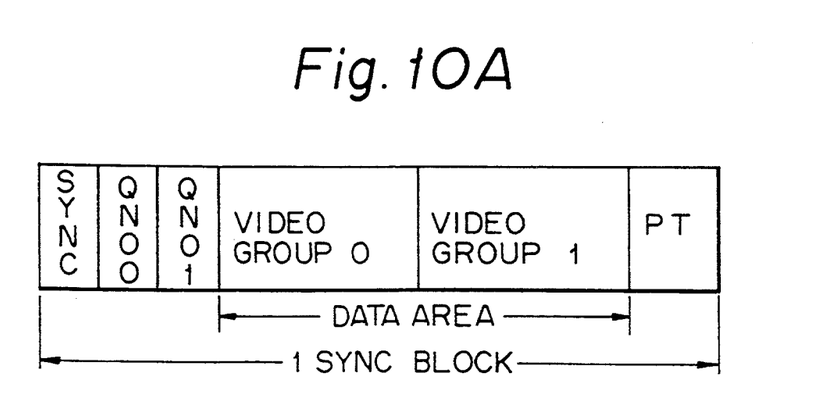
FIGS. 10A and 10B are schematic diagrams which illustrate an alternative format for a video sync block in accordance with the present invention, and an arrangement of quantization numbers therein, respectively.
Figure 10B:
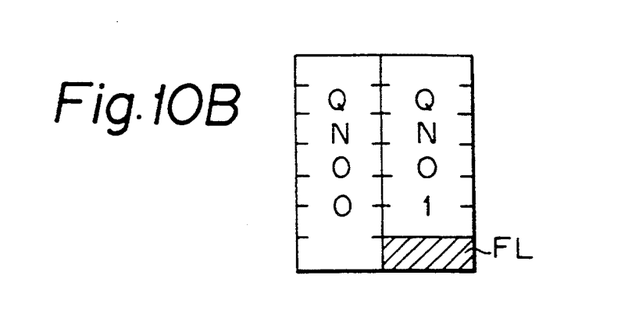

FIG. 10A illustrates a sync block generated in accordance with a further embodiment of the present invention wherein each sync block contains a plurality of video groups. In the example of FIG. 10A, two such video groups, video group 0 and video group 1 are included in a single sync block, together with respective quantization numbers QNO0 and QNO1. With reference also to FIG. 10B, illustrating the format of the two quantization numbers QNO0 and QNO1, a single bit in their data area is used for a flag FL which indicates whether or not the two quantization numbers QNO0 and QNO1 are the same. For example, if the two quantization numbers are the same, the flag FL is set to "1", and otherwise it is set to "0". Where more than two video groups are contained within a single sync block, a multi-bit flag FL is provided as necessary. The inclusion of the flag FL provides further protection against an error in the quantization numbers. If, for example, one of the two quantization numbers contains an error, when the flag FL is set to "1", it is known that the other quantization number is the same and it may be used in place of the quantization number containing the error.

It should be noted that the value of the quantization interval for the data included within a sync block may be provided therein along with the quantization number, as explained hereinabove.

While the present invention has been described in connection with a digital VTR, it will be appreciated that the present invention is likewise applicable to apparatus for recording/reproducing a disc-type medium as well as to other applications involving the transmission of digital image signals via a communication line or medium. It will be seen from the foregoing that the present invention enhances the protection against errors in quantization interval information since each sync block includes such information. Moreover, even where data is reproduced discontinuously, since each sync block includes information representing the quantization interval of the respective data therein, the data of each reproduced, valid sync may be recovered despite the loss of other sync blocks including the quantization interval information.

Having described certain advantageous embodiments of the present invention with reference to the accompanying drawings, it is to be understood that the invention is not limited to those precise embodiments, and that various changes and modifications may be effected therein by one skilled in the art without departing from the scope or the spirit of the invention as defined in the appended claims.

What is claimed is:

1. An apparatus for variable length encoding and transmitting a plurality of predetermined portions of digital image signals which have been encoded to compress image data therein, comprising:

first variable length encoding means for encoding each of the plurality of predetermined portions to form a corresponding one of a plurality of variable length encoded portions;

data limiting means for limiting an amount of image data contained in each of said plurality of predetermined portions such that an amount of data contained in the corresponding one of said plurality of variable length encoded portions is equal to or less than a predetermined target value, said limiting means including first quantizing means for requantizing said image data contained in each of said plurality of predetermined portions with a corresponding predetermined quantization interval of equal value;

sync block transforming means for arranging said plurality of variable length encoded portions in a plurality of sync blocks having a predetermined data length such that each of said plurality of variable length encoded portions requantized by said corresponding quantization interval of equal value is contained entirely within a respective plurality of sync blocks;

supplying means for supplying a single quantization number representing said corresponding predetermined quantization interval of equal value to a portion of each of said plurality of sync blocks separate from said variable length encoded portions, thereby reducing the amount of quantization interval data supplied to said sync blocks; and transmission means for transmitting each said respective plurality of sync blocks via a transmission medium.

2. The apparatus of claim 1, wherein said data limiting means further comprises selecting means for selecting said corresponding predetermined quantization interval of equal value so that an amount of data contained in the corresponding one of said plurality of variable length encoded portions is equal to or less than said predetermined target value.

3. The apparatus of claim 2, wherein the selecting means comprises:

second quantizing means for producing a plurality of requantized portions by requantizing the image data contained in each of said plurality of predetermined portions with a plurality of respective test quantization intervals;

second variable length encoding means for variable length encoding each of said plurality of requantized portions to form a plurality of corresponding variable length encoded test portions;

data amount determining means for determining a respective amount of data in each of said plurality of corresponding variable length encoded test portions; and quantization interval selecting means for selecting said corresponding predetermined quantization interval based on the amounts of data in said plurality of corresponding variable length encoded test portions.

4. The apparatus of claim 3, wherein said quantization interval selecting means comprises:

means for comparing the respective amount of data in each of said plurality of corresponding variable length encoded test portions with said predetermined target value to detect an optimal one of the respective amounts of data which is closest to and less than said predetermined target value; and means for selecting said corresponding predetermined quantization interval so that one of said plurality of respective test quantization intervals corresponding to the one of said plurality of corresponding variable length encoded test portions comprises said optimal one of the respective amounts of data.

5. A method for variable length encoding and transmitting a plurality of predetermined portions of digital image signals which have been encoded to compress image data therein, comprising the steps of:

variable length encoding each of the plurality of predetermined portions to form a corresponding one of a plurality of variable length encoded portions;

limiting an amount of image data contained in each of said plurality of predetermined portions such that an amount of data contained in the corresponding one of said plurality of variable length encoded portions is equal to or less than a predetermined target value;

requantizing said image data contained in each of said plurality of predetermined portions with a corresponding predetermined quantization interval of equal value;

arranging said plurality of variable length encoded portions in a plurality of sync blocks having a predetermining data length such that each of said plurality of variable length encoded portions requantized by said corresponding quantization interval of equal value is contained entirely within a respective plurality of sync blocks;

supplying means for supplying a single quantization number representing said corresponding predetermined quantization interval of equal value to a portion of each of said plurality of sync blocks separate from said variable length encoded portions, thereby reducing the amount of quantization interval data supplied to said sync blocks; and transmitting each said respective plurality of sync blocks via a transmission medium.

6. The method of claim 5, wherein the step of limiting said amount of image data comprises selecting said corresponding predetermined quantization interval of equal value so that an amount of data contained in the one of said plurality of variable length encoded portions corresponding to the requantized one of said plurality of predetermined portions is equal to or less than said predetermined target value.

7. The method of claim 6, wherein the step of selecting said respective quantization interval comprises requantizing each of said plurality of predetermined portions with a plurality of predetermined test quantization intervals to produce a plurality of requantized portions;

variable length encoding each of said plurality of requantized portions to form a plurality of corresponding variable length encoded test portions;

determining a respective amount of data in each of said plurality of corresponding variable length encoded test portions; and selecting said respective quantization interval based on the amounts of data in said plurality of corresponding variable length encoded test portions.

8. An apparatus for variable length encoding and transmitting a plurality of predetermined portions of digital image signals which have been encoded to compress image data therein, comprising:

variable length encoding means for encoding each of the plurality of predetermined portions to form a corresponding one of a plurality of variable length encoded portions;

requantization means for requantizing each of said plurality of predetermined portions with the use of a corresponding predetermined quantization interval of equal value to limit an amount of image data contained therein such that an amount of data contained in each of said plurality of variable length encoded portions is equal to or less than a predetermined target value;

sync block transforming means for arranging said plurality of variable length encoded portions in a plurality of sync blocks having a predetermined data length such that each of said plurality of variable length encoded portions is contained entirely within a respective plurality of sync blocks;

data addition means for adding respective quantization interval data to each of said plurality of sync blocks representing said corresponding predetermined quantization interval of the data included therein; and transmission means for transmitting each said respective plurality of sync blocks including said respective quantization interval data via a transmission medium.

9. An apparatus for recording variable length encoded digital image signals in a plurality of tracks on a recording medium, comprising:

means for receiving a plurality of predetermined portions of digital image signals which have been encoded to compress image data therein;

first quantizing means for requantizing each of said plurality of predetermined portions with the use of a corresponding predetermine quantization interval of equal value to produce a plurality of requantized portions;

first variable length encoding means for encoding each of said plurality of requantized portions to form a plurality of variable length encoded portions;

estimating means for estimating an amount of data contained in said each of said plurality of requantized portions upon variable length encoding thereof;

selecting means for selecting said corresponding predetermined quantization interval of equal value based on the estimated amount of data such that an amount of data included in each of said plurality of variable length encoded portions is equal to or less than a predetermined target value;

sync block transforming means for arranging said plurality of variable length encoded portions in a plurality of sync blocks having a predetermined data length such that each of said plurality of variable length encoded portions is contained entirely within a respective plurality of sync blocks;

data addition means for adding respective quantization interval data to each of said plurality of sync blocks representing said corresponding predetermined quantization interval of the data included therein; and recording means for recording said plurality of sync blocks including said respective quantization interval data in said plurality of tracks such that plural ones of the variable length encoded portions arranged in said plurality of sync blocks are recorded in each of the tracks.

10. The apparatus of claim 9, wherein said estimating means comprises:
   second quantizing means for producing a plurality of requantized test portions by requantizing the image data contained in each of said plurality of predetermined portions with a plurality of respective test quantization intervals;
   second variable length encoding means for variable length encoding each of said plurality of requantized test portions to form a plurality of corresponding variable length encoded test portions; and
   data amount determining means for determining a respective amount of data in each of said plurality of corresponding variable length encoded test portions.

11. The apparatus of claim 9, wherein said recording means is operative to record a frame of video data in the form of said plurality of sync blocks in ten tracks on said recording medium.

12. An apparatus for variable length encoding and transmitting a plurality of predetermined portions of digital image signals which have been encoded to compress image data therein, comprising:
   variable length encoding means for encoding each of the plurality of predetermined portions to form a corresponding one of a plurality of variable length encoded portions;
   requantization means for requantizing each of said plurality of predetermined portions with the use of a respective quantization interval to limit an amount of image data contained therein such that an amount of data contained in each of said plurality of variable length encoded portions is equal to or less than a predetermined target value;
   sync block transforming means for arranging said plurality of variable length encoded portions in a plurality of sync blocks having a predetermined data length such that each of said plurality of sync blocks contains plural ones of said variable length encoded portions;
   data addition means for adding data to each of said plurality of sync blocks including respective quantization interval data for each of said plural ones of said variable length encoded portions therein and a flag indicating whether said respective quantization interval data are the same or whether said respective quantization interval data are different; and
   transmission means for transmitting said plurality of sync blocks including said respective quantization interval data and said flag via a transmission medium.

13. A method for variable length encoding and transmitting a plurality of predetermined portions of digital image signals which have been encoded to compress image data therein, comprising the steps of:
   encoding each of the plurality of predetermined portions to form a corresponding one of a plurality of variable length encoded portions;
   requantizing each of said plurality of predetermined portions with the use of a respective quantization interval to limit an amount of image data contained therein such that an amount of data contained in each of said plurality of variable length encoded portions is equal to or less than a predetermined target value;
   arranging said plurality of variable length encoded portions in a plurality of sync blocks having a predetermined data length such that each of said plurality of sync blocks contains plural ones of said variable length encoded portions;
   adding data to each of said plurality of sync blocks including respective quantization interval data for each of said plural ones of said variable length encoded portions therein and a flag indicated whether said respective quantization interval data are the same or whether said respective quantization interval are different; and
   transmitting said plurality of sync blocks including said respective quantization interval data and said flag via a transmission medium.

14. An apparatus for variable length encoding and transmitting a plurality of predetermined portions of digital image signals which have been encoded to compress image data therein, comprising:
   first variable length encoding means for encoding each of the plurality of predetermined portions to form a corresponding one of a plurality of variable length encoded portions;
   data limiting means for limiting an amount of image data contained in each of said plurality of predetermined portions such that an amount of data contained in the corresponding one of said plurality of variable length encoded portions is equal to or less than a predetermined target value;
   first quantizing means for requantizing the image data contained in each of said plurality of predetermined portions with a corresponding predetermined quantization interval;
   second quantizing means for producing a plurality of requantized portions by requantizing the image data contained in each of said plurality of predetermined portions with a plurality of respective test quantization intervals;
   second variable length encoding means for variable length encoding each of said plurality of requantized portions to form a plurality of corresponding variable length encoded test portions;
   data amount determining means for determining a respective amount of data in each of said plurality of corresponding variable length encoded test portions;
   quantization interval selecting means for selecting said corresponding predetermined quantization interval based on the amounts of data in said plurality of corresponding variable length encoded test portions so that an amount of data contained in the corresponding one of said plurality of variable length encoded portions is equal to or less than said predetermined target value;
   sync block transforming means for arranging said plurality of variable length encoded portions in a plurality of sync blocks having a predetermined data length such that each of said plurality of variable length encoded portions is contained entirely within a respective plurality of sync blocks; and
   transmission means for transmitting each said respective plurality of sync blocks via a transmission medium.

15. The apparatus of claim 14, wherein said quantization interval selecting means comprises:

means for comparing the respective amount of data in each of said plurality of corresponding variable length encoded test portions with said predetermined target value to detect an optimal one of the respective amounts of data which is closest to and less than said predetermined target value; and means for selecting said corresponding predetermined quantization interval as that one of said plurality of respective test quantization intervals corresponding to the one of said plurality of corresponding variable length encoded test portions having said optimal one of the respective amounts of data.

16. A method for variable length encoding and transmitting a plurality of predetermined portions of digital image signals which have been encoded to compress image data therein, comprising the steps of:

variable length encoding each of the plurality of predetermined portions to form a corresponding one of a plurality of variable length encoded portions;

limiting an amount of image data contained in each of said plurality of predetermined portions such that an amount of data contained in the corresponding one of said plurality of variable length encoded portions is equal to or less than a predetermined target value;

requantizing each of said plurality of predetermined portions with the use of a respective quantization interval to limit an amount of image data contained therein;

requantizing each of said plurality of predetermined portions with a plurality of predetermined test quantization intervals to produce a plurality of requantized portions;

variable length encoding each of said plurality of requantized portions to form a plurality of corresponding variable length encoded test portions;

determining a respective amount of data in each of said plurality of corresponding variable length encoded test portions;

selecting said respective quantization interval based on the amounts of data in said plurality of corresponding variable length encoded test portions so that an amount of data contained in the one of said plurality of variable length encoded portions corresponding to the requantized one of said plurality of predetermined portions is equal to or less than said predetermined target value;

arranging said plurality of variable length encoded portions in a plurality of sync blocks having a predetermined data length such that each of said plurality of variable length encoded portions is contained entirely within a respective plurality of sync blocks; and transmitting each said respective plurality of sync blocks via a transmission medium.

17. An apparatus for recording variable length encoded digital image signals in a plurality of tracks on a recording medium, comprising:

means for receiving a plurality of predetermined portions of digital image signals which have been encoded to compress image data therein;

first quantizing means for requantizing each of said plurality of predetermined portions with the use of a respective quantization interval to produce a plurality of requantized portions;

first variable length encoding means for encoding each of said plurality of requantized portions to form a plurality of variable length encoded portions;

second quantizing means for producing a plurality of requantized test portions by requantizing the image data contained in each of said plurality of predetermined portions with a plurality of respective test quantization intervals;

second variable length encoding means for variable length encoding each of said plurality of requantized test portions to form a plurality of corresponding variable length encoded test portions;

data amount determining means for determining a respective amount of data in each of said plurality of corresponding variable length encoded test portions;

selecting means for selecting said respective quantization interval based on the determined amount of data such that an amount of data included in each of said plurality of variable length encoded portions is equal to or less than a predetermined target value;

sync block transforming means for arranging said plurality of variable length encoded portions in a plurality of sync blocks having a predetermined data length such that each of said plurality of variable length encoded portions is contained entirely within a respective plurality of sync blocks;

data addition means for adding respective quantization interval data to each of said plurality of sync blocks representing the respective quantization interval of the data included therein; and recording means for recording said plurality of sync blocks including said respective quantization interval data in said plurality of tracks such that plural ones of the variable length encoded portions arranged in said plurality of sync blocks are recorded in each of the tracks.

18. The apparatus of claim 17, wherein said recording means is operative to record a frame of video data in the form of said plurality of sync blocks in ten tracks on said recording medium.

* * * * *